2,836,848

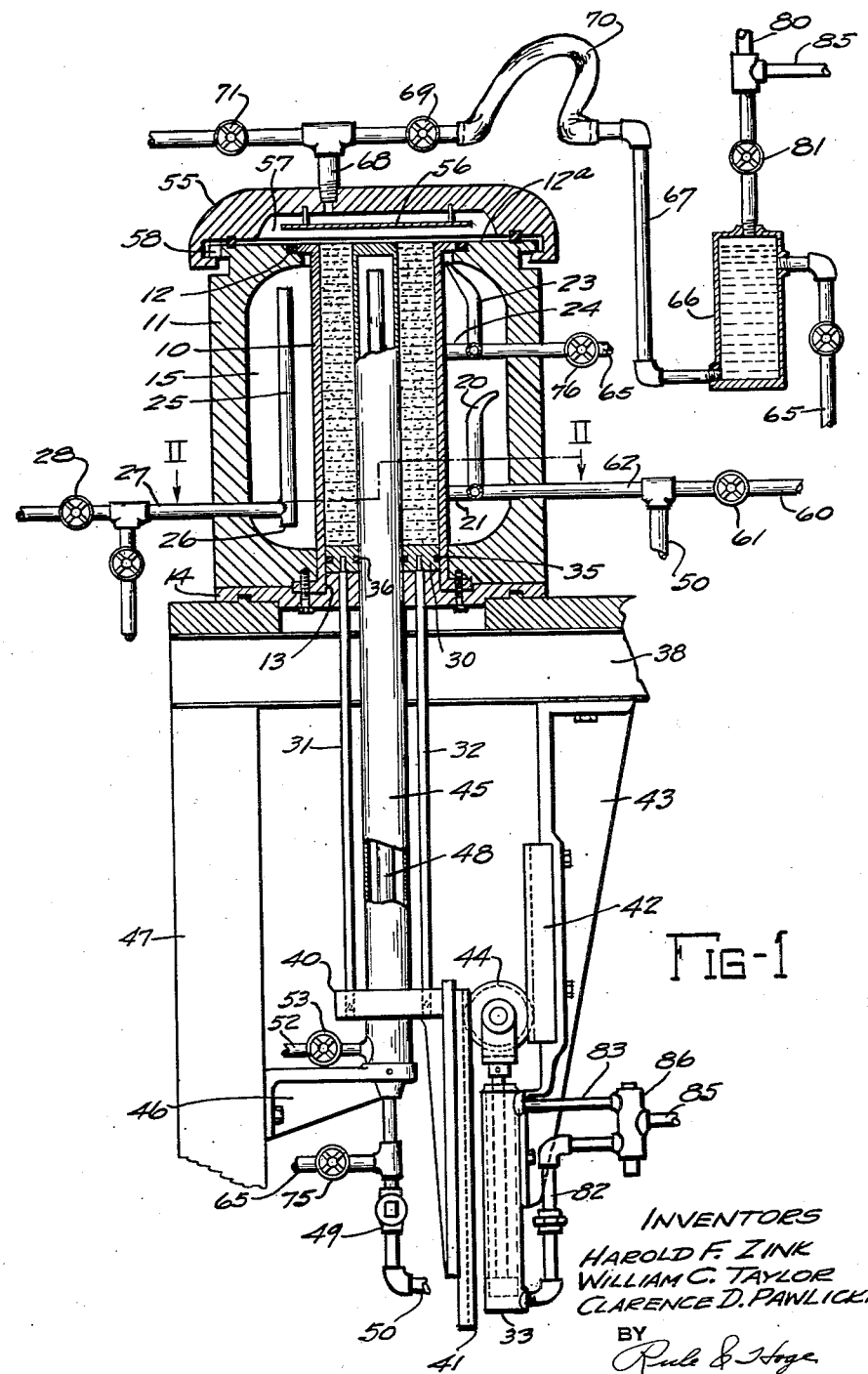

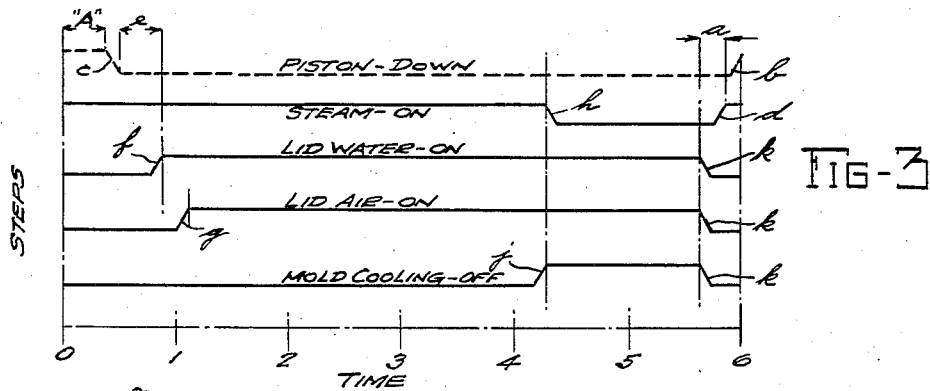
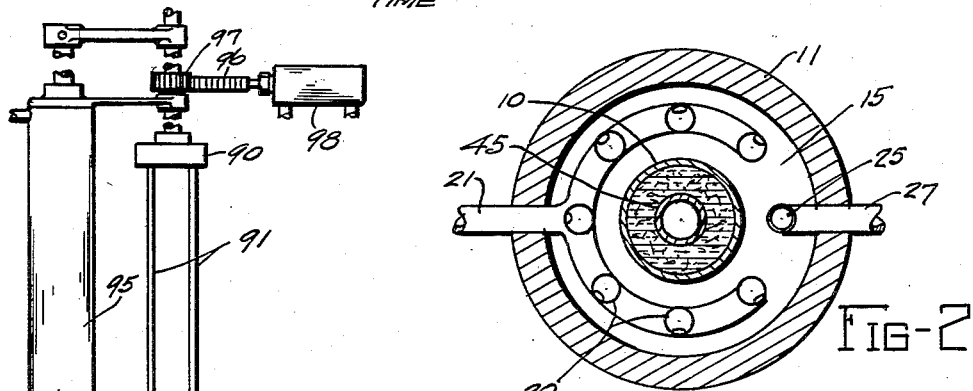
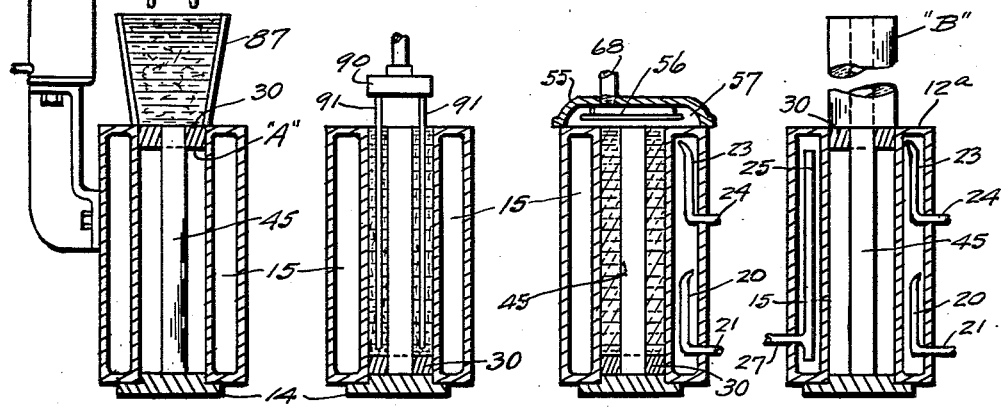

METHOD AND APPARATUS FOR FORMING CALCIUM SILICATE PRODUCTS

Harold F. Zink, William C. Taylor, and Clarence D. Pawlicki, Toledo, Ohio, assignors to Owens-Illinois Glass Company, a corporation of Ohio Application March 27, 1953, Serial No. 345,066

22 Claims. (Cl. 18—5)

The accompanying drawings and description illustrate and describe a mechanism and a method for the forming of calcium silicate products, such as pipe covering, core blocks, etc.

The molded insulation or other products contemplated herein will preferably be produced from lime-silica aqueous slurries wherein the molar ratio of lime to silica may be within the range of from .65:1 to 1:1 and the water to solids ratio may be at least .75:1 by weight. However, other reactive agents or materials such as magnesia, etc., may also be utilized in this method and mechanism.

The preferred density for pipe covering is approximately 11 p. c. f., but it is contemplated that other products in other density ranges will be produced for specific purposes or uses. Also the preferred form of suspension of the solids in the liquid slurry will be in accordance with the disclosure of the patent to Fraser Re. 23,288 dated May 9, 1950, but other agents of suspension and/or dispersion may be utilized, such as, bentonite, powdered aluminum, etc.

In this present process it is preferable to use an aqueous type of slurry consisting essentially of lime, silica, asbestos fibers and water as the basic materials and to form these into slurries, wherein the original water to solids ratio may be within the range of from .75:1 by weight to approximately 7:1 by weight, depending upon the density desired in the integrated end product.

So far as this new method is concerned the essential advantages are, (a) pouring a mixed slurry into preheated molds, (b) then heating under pressure both the water and the reactants forming the slurry while contained within each individual mold, (c) eliminating the heat in the indurated product by rapidly cooling the mold walls and while maintaining a pressure upon the product which is sufficient to prevent flashing of the water in the product, and (d) then reducing the said pressure to atmospheric pressure.

The essence of this new method is (a) to utilize present commercial slurries in such manner as to produce the usually good commercial product, (b) obtaining such production with a lesser number of molds tied up for long periods of time and (c) producing end products having a dimensional stability better than possible with any present process.

The primary object herein is the provision of a method whereby lime-silica or other reactive slurries may be converted to calcium silicate or other products of formed, shaped, and indurated structures in a minimum time interval.

A further object is to provide a mechanism wherein each individual mold has its own individual indurator with individual control thereof.

A still further object is to provide an overlap cycle in the step operation of this new method.

Another object is to provide separate control of the application of pressure, heating or cooling to the slurry per se, and the walls of the mold.

Other objects will be apparent from the following descriptive material.

In the drawings:

Fig. 1 is a cross-sectional vertical elevation through a molding unit;

Fig. 2 is a cross-sectional view at the line II—II on Fig. 1;

Fig. 3 is a diagrammatic chart which illustrates the relationship of the various steps of a forming cycle; and Figs. 4–7 inclusive are diagrammatic views illustrating the sequence of operations.

To this end there is provided a mechanical arrangement wherein each individual mold has or is its own individual indurator, i. e., a type of structure wherein the mold in operating effect always forms an integral part of the indurator as distinguished from the usual arrangement wherein a series of slurry filled molds are alternately fed into and out of a single indurator.

In this combined indurator-mold arrangement the structure presently contemplated is such that steam can entirely encompass the major portion of all of the external surface area portions of the mold walls to thereby provide heat therethrough to the slurry contacting all such areas. However, this structure is of such design that the upper or fill opening end of the mold proper is isolated from the balance of the mold, i. e., so far as the remaining mold walls may be concerned and the application of heating, cooling and/or pressure. The purpose of such isolation is to permit the surface area of the slurry in the fill opening of the mold to be individually exposed and thereby be separately subject to any heating or cooling by steam, air or other fluid media under pressure or otherwise, and separate and apart from any heating or cooling media supplied to or in contact with the outer surface area portions of the mold.

Separation of the two chambers prevents contact between the heating and cooling media (steam, cool water, etc.) with the attendant pressure drop on the slurry and it also permits application of a pressure upon the slurry which is independent of the temperature of the slurry and without interference with the cooling or heating mechanisms of the steam chamber.

It is to be understood that air or fluid pressure on the slurry does not in itself necessarily cool the slurry—it serves to prevent a flashing of the steam or water from the slurry upon removal of the external steam heating source.

Presently this disclosure is primarily concerned with the production of reacted or indurated products in the form of pipe covering but of course it is contemplated that the same method and apparatus may be applied to making other shaped products, such as core material, roof tile, etc.

The making of pipe covering in cylindrical form starting with an aqueous slurry inherently requires that the mold be positioned vertically and the pipe so cast. Thus a cylindrical mold part is either interchangeably positioned or permanently built into an indurator or cylindrical shape and in such manner that a steam heating chamber area for heating the cylindrical mold walls is provided therebetween. The top of this indurator portion is sealed off thus enclosing and forming a jacketed or steam chambered mold but leaving the top or fill opening of the mold open for the purpose of exposing the slurry to be placed therein. Over this open end of the mold and above the steam chamber but isolated and separate from said steam chamber there will be positioned a cover which is so shaped or hollowed out as to provide a second chamber area over the top of the mold and enclosing the fill opening of the mold.

Such a structure permits the temperature conditions in each of said chambers to be individually controlled which is a structural feature essential to obtaining and permitting the rapid declination of temperature in the pre-indurated shaped product, from a temperature above 212° F. down to approximately room temperature, without ebullition in or destruction of the shaped product.

The rapidity of this change in temperature is very important because it is one of the essential points in the operating cycle and when combined with an overlap of the method steps of the cycle it permits a very short or rapid operating cycle. In order to assist in making possible a very rapid cycle of operation the slurry is preheated in the mixer by the use of trapped steam at regulated pressure (60 p. s. i. g.) over a set period of time. The pressure available, the amount of slurry being mixed, plus the desired slurry temperature determines the duration of preheating.

The specific formulation being used will of course affect or alter the optimum temperature range of the preheating but in most instances such temperature will be within the range of from 150° F. to 180° F. However, there may be formulations wherein materials such as coarse silica will require temperatures in a higher range without producing deleterious operating difficulties but in no instance will such temperature be in excess of 212° F. or the boiling point of water at atmospheric pressure.

In heating the slurry out of the mold, the material may freely expand and the reaction started, prior to confining it within the mold, so as to force the expansion to take place in a single direction. Upon placing the preheated slurry in the mold, the material will attain a solid state (enter the solid phase) more rapidly, the thermal expansion in the mold will be reduced and excessive movement of the material while entering the solid state will be reduced to the point of preventing separation in a horizontal plane which would otherwise occur.

By filling the preheated mold with this preheated slurry the continuity of reaction, as initiated in the mixer is continued in the mold without any appreciable lag and without appreciable difference between the rate of reaction through the thickness of the material. Thus the speed of progression of the reaction is approximately constant from the time of initial mixing until the desired degree of reaction has been obtained.

In addition to the above, the temperature differentials which could exist within the slurry mass and in particular through the thickness thereof, will be reduced to a minimum and as a consequence any possibility of movement within the mass will also be reduced to a minimum.

Such preheating will provide the advantage of reducing the required heating time in the mold and particularly is this so when such slurry is deposited in an already preheated mold. The depositing of preheated slurry in a pre-heated mold immediately brings about a condition where differences in thermal expansion through the thickness of the product, are obviated mainly because of the absence of a serious temperature gradient through the thickness of the product. In order to properly and clearly present this invention one form of an operating cycle that may be utilized will be outlined hereinafter.

A measured quantity of a reactive slurry is drawn by suction or is poured into the vertically disposed cylindrical mold, which together with its center mandrel have previously been preheated to operating temperature. Vertically disposed stirring fingers are then immersed in the slurry and oscillated horizontally to thereby eliminate air pockets, folds, etc., and then withdrawn. A chambered cover is then positioned over the open upper end of the mold to enclose the exposed slurry and water, under pressure, is admitted under the cover. Then after a short interval fluid at the same pressure or slightly greater than that of the previously admitted water pressure is admitted only to this chamber under and formed by the mold cover. With the previously admitted steam around the cylindrical walls of the mold and in the hollow core or mandrel, forming the center of the mold, heat is thus provided to the slurry. This steam pressure in all the steam chambers and areas is maintained for a predetermined time interval and then discontinued.

After a predetermined time interval has elapsed the steam in the jacket or chamber surrounding the mold walls and in the mandrel is replaced with a cooling fluid under pressure which rapidly condenses the steam and provides an abrupt pressure and temperature drop therein. Thus all of the major surface areas contacting the water and solids contained in or forming the product are subject to rapid cooling while the exposed slurry surface is maintained under pressure. When the temperature of the product has dropped sufficiently, the cover is then removed, the shaped product B expelled or extruded from the mold and simultaneous with the beginning of such product expulsion the steam is again supplied to the steam chamber of the mold and mandrel to again preheat said walls prior to reception of the next successive slurry charge. During this mold preheating period the next product forming cycle is started as follows: (a) removing the shaped product; (b) a funnel device is positioned upon said mold and in cooperative relationship with the mold filling opening; (c) a measured quantity of slurry is poured into said funnel; and (d) said slurry is drawn down into the preheated mold. The further steps of the cycle previously above described are then repeated.

One of the basic ideas of this invention is to provide each individual mold, which may if desired have one or more cavities formed therein, with its individual indurator and with its own pressure, heating, cooling, and operating cycle regulation.

In order to economically produce the various sizes of pipe covering required commercially, it is found necessary to have an operating setup consisting of a series of groups of molds, each group consisting of molds of a particular size range, the individual molds of each group having a different outside diameter and each provided with a means whereby more than one size of core forming mandrel may be utilized with any given mold diameter. With such an arrangement all of the various commercial sizes of pipe covering may be produced. All of these individual units will be alike in basic design, the only change being in the inside diameter of the mold and the outside diameter of the core mandrel.

In Fig. 1 there is illustrated one form of a mechanical arrangement in a forming mechanism capable of carrying out the previously described cycle and in which 10 is a mold for forming one of the many ranges of outside diameters necessary in the series of molded pipe covering sizes. Said mold is interchangeably mounted in its own indurator 11. The upper end of the mold 10 is so arranged that it will form a seal 12 with the top end of the indurator 11 and also form a flat upper surface 12a from which any surplus slurry may be easily removed. The bottom end of the cylindrical mold 10 fits over a locating shoulder 13, said shoulder formed on the bottom plate 14 of the mold. The mold 10 and indurator 11 are so formed and assembled that a chamber 15 exists therebetween into which steam, water or other heating or cooling mediums may be projected under pressure or otherwise. A series of pipes 20 on a header 21 are provided to supply steam for heating the vertical walls of the mold 10. A similar arrangement of pipes 23 on a header 24 supply cooling media at the proper time intervals. An exhaust system for chamber 15 consists of at least one vertical pipe 25 open at its upper end and a lower open pipe 26 connected to an exhaust pipe 27 and a control valve 28. A piston 30 is positioned during one portion of the cycle in the bottom of the mold 10 and arranged for vertical reciprocation therein through rods 31 and 32, a double acting gear and rack mechanism and an air motor 33. Said piston 30 is supplied with pliable or resilient piston rings 35 and 36.

The rods 31 and 32 are mounted at their lower ends in a yoke 40, said yoke carrying at one side thereof a vertically disposed rack 41. Opposite and above but in operative alignment with rack 41 is a second vertical, stationary rack 42 mounted on vertical bracket 43 depending from the indurator support 38. Interposed between said racks 41 and 42 is a gear member 44 having meshed teeth connection with both racks. Any vertical motion of gear 44 relative to rack 42 will cause rack 41 to move in the same direction as that of the gear 44 but through a greater distance. Thus, with the design shown movement of gear 44 will move rack 41, yoke 40, rods 31 and 32 and connected piston 30 to expel or extrude a formed piece of material from mold 10 and on its opposite stroke to draw new slurry down into and fill the mold 10.

A core member 45, made for example of seamless tubing, sealed at its upper end, extends upwardly through the mold bottom 14, along the vertical centerline of the mold 10 and is supported in such position at its bottom end by a bracket 46 mounted on an upright 47. The core 45 is so arranged that steam, water or other heating or cooling media may be entered into its upper end through pipe 48 to thereby heat or cool the inside diameter of the slurry in contact therewith while being molded. Such heating and/or cooling media may enter respectively from pipes 50 and 65 and be controlled by valves 61 and 75. A check valve 49 in line 50 prevents any flow of the cooling media back into the steam line 50. Such media is exhausted through pipe 52 and control valve 53. A cover 55 is removably attached to the indurator 11 by a well-known means, such as a bayonet type of fastening 58. A baffle plate 56 is mounted within chamber 57 and so positioned as to act as a baffle to spread the pressure air or other media as it is admitted to this space as well as to prevent direct impact thereof upon the slurry in the mold. The mold 10, bottom 14, piston 30 and core 45 are all interchangeable to permit making products having different diameters and thicknesses.

Heating and cooling media are admitted to and exhausted from the chambers 15 and 57 and core 45 as follows. A main steam line 60 provides steam in a preferred pressure range from approximately 15 p. s. i. to approximately 20 p. s. i. (gauge pressure) to a control valve 61 which when opened admits steam to chamber 15 and to core 45 through pipe 48. When valve 61 is opened steam flows under pressure through pipe 62 to header 21 (Fig. 2) and then to a series of vertical outlets 20 within chamber 15. These outlets 20 are positioned to direct the steam in such manner that no direct impingement upon the mold walls 10 can occur and thus localized or spot heating is avoided.

A main water supply line 65 is provided which supplies water under pressure to a reservoir 66 and to other points for ultimate use in the system. Supply lines 67 and 68 lead from the tank 66 to chamber 57 and a control valve 69 will control the admission of water to the chamber 57 in the proper time sequence. A flexible hose 70 forms a portion of this line to permit flexibility for removal of cover 55 when required. A valve 71, normally closed, controls exhausting of chamber 57 at the proper intervals.

Main water line 65 which also has connection with mandrel 45 is arranged for controlled water supply to the mandrel 45 through valve 75 and for admission of water to chamber 15 through pipes 23 and header 24 under control of the valve 76. Valves 75 and 76 are arranged for simultaneous opening and closing in order that chamber 15 and mandrel 45 may be cooled at the same time. Valves 28 and 53 are also arranged for simultaneous opening and closing in order to obtain proper control of the venting of chambers 15 and 45 during the heating and cooling cycles.

An air line 80 is arranged to supply air under a pressure of approximately 30 p. s. i. (ga.) to tank 66 under control of valve 81 whereby a water saturated air or fluid may be supplied to chamber 57 at the desired time. The purpose of combining the air and water under pressure is to provide a medium under pressure over the slurry surface which will prevent drying out of the slurry and any possible ebullition or flashing due to rapid temperature changes which will occur in the cycle. A further air line 85 extends from the air main 80 and leads to a reversing valve 86 which is arranged to alternately feed air to opposite ends of the cylinder 33 for the purpose of moving piston 30 to alternately fill the mold 10 and expel the formed product B therefrom.

The opening and closing of all of the various valves involved in the operation of this mechanism may be controlled and timed in proper sequence to carry out a desired operating cycle by any well-known means (not shown) and these valves may be operated or actuated by air motors or solenoids, as may be desired. A series of these molding units may be arranged in a circle, straight line or otherwise and may also be interconnected to operate in sequence by means of a timing mechanism.

The operation of any individual forming unit is indicated diagrammatically in the chart of Fig. 3 and is as follows:

In this chart the cycle steps are illustrated in a possible time relationship with respect to each other and to the movements of the filling and extending piston 30 because all of the steps of the operating cycle are contingent upon the movements of the said piston. With removal of the closure cover 55 as at $a$ the piston 30 will move as indicated at $b$ to its up position A and extrude the previous molded charge. The dotted line of Fig. 3 shows the relative position of piston 30 to the various steps of a forming cycle. The funnel 87 is positioned as in Fig. 4 filled with a measured quantity of slurry and the slurry is then drawn down into the mold by a vacuum created by the down stroke $c$ of the piston 30. Entrapped air pockets, folds and slips tend to form during the mold filling and in order to insure the absence of these air pockets, orientation of fibers, folds, slips, etc., a device formed of a crosshead 90 and a series of vertical fingers 91 is lowered into the slurry in the mold either following the piston 30 as it goes down or else subsequent to the piston reaching its full down position. This device while in its lowered position is oscillated about its vertical axis to move the fingers 91 horizontally through the slurry and such movement through slurry will definitely eliminate air pockets, fold or slip lines caused from pouring as well as other deleterious conditions. Any suitable mechanism may be utilized for these vertical and horizontal motions such as cylinder 95 for the vertical motion, the rack 96, pinion 97, and cylinder 98 for the horizontal motion.

Beginning with the extrusion stroke $b$ of piston 30 steam under pressure is admitted to chamber 15 as indicated at $d$ and the inside of core 45 to preheat the walls of the mold 10 and core 45 thus providing immediate heat contact for the slurry as the piston 30 draws same down into the confines of mold 10. Thus there is no lapse of time between the filling of the mold and the application of heat to the slurry.

After the mold is filled by the down stroke of piston 30, the cover 55 is positioned on the indurator 11 at $e$ and is locked in said position by the bayonet lock 58. A solenoid operated valve 69 is opened allowing water under relatively low pressure to enter through line 68 into the chamber 57 formed by cover 55 in its position over the mold 10 as indicated at $f$. After a short application of water under the cover 55 air under pressure is combined with the water, as at $g$ and thus the exposed slurry surface is placed under a pressure sufficient to prevent flashing when the high temperature is rapidly dropped later in the cycle. Steam which has previously been admitted, as above mentioned, through pipes 20 into the chamber 15 between the side walls of the mold 10 and the inside walls of the indurator 11 by valve 61 which also permits steam to line 50 to heat the mandrel or core 45. The maintained time interval of the application of steam in these several chambers and around the various members is dependent upon the density of the end product, the initial temperature of the slurry as fed to the mold 10, the wall thickness of the end product and the type of reactive components in the slurry. For example, if the walls of the end product are 3" thick and the desired density of the end product being approximately 11 p. c. f. and the slurry being essentially reactive lime, silica with silica being in the form of quartz and diatomaceous earth, an accelerator such as sodium hydroxide added and water, then a cycle of approximately 25 minutes per inch of thickness will normally be required in order to indurate such a slurry to a point or degree where it will support its own weight without collapsing when removed from the mold.

Asbestos either in spiculated or long fiber form or both may be used in any of these slurries for its various desired benefits and purposes.

When the desired degree of induration has been obtained the steam to chamber 15 is cut off by valve 61 as at h and the steam is immediately replaced as at j by a cooling fluid under pressure which is admitted from line 65 by valve 76 through header 24 and pipes 23. A baffle plate 56 is positioned in chamber 57 to spread the cooling fluid in chamber 57 which may be pressure air and/or water over the top area of the shaped product and prevent localized disturbance or chilling thereof. The water supplied to chamber 15 rapidly cools the side walls of mold 10 and in turn the preset product. After the lapse of a short time interval the temperature of the solids forming the product "B" and its contained free water has dropped below the boiling point, 212° F. at atmospheric pressure, and the possibility of ebullition or rupture of the product is obviated by the combined air and water under pressure in chamber 57. If comparatively low air and water pressures are being utilized the cover 55 may be removed at a or immediately the temperature of the product B has been reduced to the desired point as at k and the lid air and water and the cooling water also cut off at the same point. However, in the use of higher pressures it is obvious that such pressures must be controlled before the cover 55 is removed. With the removal of cover 55 valve 86 is actuated from a timer or any other well-known means to admit fluid pressure from main lines 80 and 85 of cylinder 23 through line 82 to move gear 44 upwardly and through racks 41 and 42 to move piston 30 upwardly as at b and expel or extrude the formed product B. This piston 30 will remain in this up position A and cooperate with funnel 87 in the next filling of mold 10. Immediately the piston 30 starts its expelling stroke, or slightly before, steam is again admitted to chamber 15 as at d to preheat the side walls of mold 10 preparatory to receiving its next consecutive charge. Funnel 87 is again filled while positioned over mold 10, the valve 86 is reversed supplying air to line 83 and to the top end of cylinder 23 to move piston 30 downwardly as at c and draw slurry from funnel 87 down into mold 10 through the suction created by this down stroke of the piston. In this manner the time interval that would normally be lost to productive use between cycles is completely utilized. In other words, during the period starting with the removal of the previously shaped product B the funnel 87 is positioned over the mold opening and filled with a quantity of slurry, the mold walls 10 are being preheated to operating temperature preparatory to receiving the next charge of slurry so the time which would normally be required to subsequently heat the mold walls and the charge per se, after its reception into the mold 10 is thereby reduced to the minimum. Through such operation an overlap cycle is thus obtained which permits increased productivity from each mold as well as more stable dimensions in the end product. The cycle of molding is then again repeated as previously described hereinabove.

The following is a normal sequence of steps that may be followed in an operating cycle:

After filling the preheated mold with a measured amount of slurry which has been preheated to a temperature within the range of from 150° to 180° F., said slurry is stirred by horizontally oscillating stirring fingers 91 and the fingers then are removed. A cover 55 is positioned upon the upper end of the mold 10 to form a slurry chamber 57 and water alone is admitted to this chamber for a limited interval by valve 69 prior to locking the cover 55 to thus cleanse the surface 12a to permit a good seal to be obtained. Then cover 55 is locked by the bayonet lock 58 and air under a pressure of approximately 30 p. s. i. (ga.) is admitted by valve 81 into water tank 66 thus providing in effect an air pressure upon the water on the surface of the slurry in the mold 10 and in chamber 57.

The use of this excess volume of air and water under pressure as provided by tank 66 prevents any possible drying out of the upper areas of the slurry, due to evaporation or boiling and also prevents flashing of the water when excessively rapid cooling later occurs in the cycle.

A further advantage of the use of this combined air and water under pressure is to reduce the entrapped air bubbles in the slurry to a minimum both in number and size. In other words this application of pressure not only reduces the size of any entrapped bubbles but maintains such reduction until the material sets up or reacts to the point where the bubbles will not affect the product. With the release of this pressure the entrapped air will filter out of the product without affecting its structure in any manner.

The pressure may also be applied solely through the use of water under pressure of approximately 30 p. s. i. (ga.) and equally good results obtained.

After a desired period of heating of the slurry has been accomplished the steam to the mold jacket 15 and mandrel 45 is shut off by valve 61 and as the steam chamber 15 and slurry chamber 57 are isolated one from the other any cooling or heating in either chamber remains independent as to effect and control. As the steam to chamber 15 and mandrel 45 is shut off the combined air-water media to chamber 57 is continued and the steam in chambers 15 and 45 is replaced by cooling water thus rapidly chilling the mold walls 10, mandrel 45 and the contained product. An exhaust valve 28 permits rapid flow of the coolant through chamber 15.

The maintenance of the air-water pressure in chamber 57 prevents the water in the preset product from boiling, which would occur if the pressure were suddenly released while the temperature of the product was sufficiently high to be above corresponding boiling temperature of water at the lowered pressure. Such boiling would cause a destruction of the product and in some instances an explosive destruction due to the sudden boiling of the water in the preset product.

When the temperature of the product has reached a point at least less than the boiling point of water at atmospheric pressure valve 69 is closed and valve 71 is opened to the atmosphere the cover 55 is removed while immediately subsequent thereto the piston 21 moves up to extrude the shaped product, and the water to chambers 15 and 45 is discontinued and replaced by steam to thus begin the next forming cycle.

It is to be understood that slurries other than lime and silica slurries may be utilized in this invention and that media other than air and water may be utilized to carry out the steps of the method.

In order to readily distinguish between the chambers mentioned herein they shall be designated in the appended claims as follows: the chamber above the slurry and on top of the mold will be the "chamber" and the center core and jacketed mold will be referred to in combined form as the "steam chamber."

Modifications may be resorted to within the spirit and scope of the appended claims.

We claim:

1. A method of indurating aqueous siliceous slurries to form self-supporting silicate products which comprises simultaneously mixing and preheating such a slurry, confining a measured quantity of said slurry in the mold portion of a heated steam chamber with at least a portion of the surface of said slurry exposed within a second chamber, applying a liquid under pressure within said second chamber and to said exposed slurry surface, heating the water content of said slurry to a degree of reaction therein sufficient to form a self-supporting shaped mass, eliminating the heat from said reacted mass by applying a cooling fluid under pressure in said chambered mold to simultaneously cool said mold walls and the mass in contact therewith, reducing the pressure in said second chamber to atmospheric pressure and removing the shaped product from the mold.

2. A method of indurating aqueous siliceous slurries to form self-supporting silicate products which comprises confining a measured quantity of a preheated slurry in the mold portion of a heated steam chamber with at least a portion of the surface of said slurry exposed within a second chamber, applying a liquid pressure to said exposed slurry, heating the contents of said slurry by applying steam under pressure to said steam chamber to thereby effect a degree of reaction in said slurry sufficient to form a self-supporting shaped mass, eliminating the heat from said reacted mass by cooling the fluid within said steam chamber of the said mold and removing the shaped product from the mold.

3. The method of indurating slurry formulations which consist essentially of lime, silica and water, which method comprises mixing said slurry, preheating a predetermined quantity of said slurry, filling such slurry into the mold portion of a heated steam chamber, one end of the said mold being open and the surface of the slurry therein exposed, enclosing said open end of the mold to form a chamber over said slurry, admitting fluid under pressure into said chamber and in contact with said slurry, the steam in said steam chamber being at a pressure of at least 15 p. s. i., regulating the duration of the application of said steam in accordance with the thickness of the product, the water to solids ratio of the slurry and the reactivity of the slurry formulation, discontinuing the steam to said steam chamber and substituting therefor a fluid cooling medium to thereby cool the mold and the molded product therein to a temperature below the boiling point of water at atmospheric pressure, extruding the shaped article from the mold and simultaneous therewith readmitting steam to the steam chamber.

4. The method of indurating slurry formulations which consist essentially of lime, silica, and water, which method comprises filling such a slurry into the mold portion of a heated steam chamber, the filling end of the said mold being open and the surface of the slurry therein exposed, enclosing said open end to form a chamber over said slurry, admitting fluid under pressure into said chamber, said fluid being under a pressure of approximately 30 p. s. i. and the steam in the steam chamber being at a pressure of at least 15 p. s. i., regulating the duration of the application of said steam to the slurry in accordance with the thickness of the product and the water to solids ratio of the slurry, cooling the molded product while in said mold to a temperature below the boiling point of water at atmospheric pressure, discontinuing the fluid pressure to the chamber, removing the shaped article from the mold and admitting steam to the steam chamber.

5. The method of forming reacted calcium silicate products from a reactive slurry, said slurry consisting essentially of lime, silica and water, which method comprises preheating a measured portion thereof, filling such portion of said slurry into the mold portion of a heated steam chamber, said mold having its filling end open and the surface of the slurry therein exposed, horizontally stirring said slurry within the mold, enclosing said exposed slurry within a chamber, admitting fluid under pressure to said chamber and into physical contact with the surface area of said slurry while continuing the steam to said steam chambered mold, regulating the duration of the application of said steam in accordance with the thickness of the end product and the water to solids ratio of the slurry, discontinuing steam to said steam chamber, continuing the application over the surface of the slurry of the fluid under pressure while simultaneously artificially cooling said mold to thereby rapidly cool both said mold and the contained indurated product and removing the shaped product therefrom.

6. The method of forming reacted silicate products from a reactive slurry, which method comprises preheating the slurry, filling a measured quantity of such a slurry into a steam chambered and preheated mold, said mold being vertically disposed with its top end open and the surface of the slurry therein exposed, enclosing said exposed slurry within chamber, admitting fluid under pressure into physical contact with the said exposed slurry while continuing heat to said chambered mold, regulating the duration of the application of said pressure to said exposed slurry and the steam to said mold in accordance with both the wall thickness of the end product and the water to solids ratio of the slurry, discontinuing steam to said chambered mold and continuing admission of the combined fluid under pressure over the surface of the exposed slurry while simultaneously artificially cooling said mold to thereby rapidly cool both said mold and the contained indurated product and removing the shaped product therefrom.

7. The method of forming reacted calcium silicate products from a reactive slurry, said slurry consisting essentially of lime, silica and water, the water to solids ratio of such formulations being greater than .75:1 by weight, which method comprises filling such a slurry into a steam heated mold, said mold having its filling end open and the surface of the slurry therein exposed, positioning a chamber over and enclosing the open end of said mold and said exposed slurry, the steam in said mold being under pressure and at a temperature in excess of 212° F., admitting water under air pressure into said chamber and into contact with the exposed surface of said slurry, regulating the duration of application of said water and steam in accordance with the thickness of the product and the water to solids ratio of the slurry, discontinuing the steam to said mold and passing a cooling medium around said mold to thereby cool both the mold and the contained indurated product, removing the shaped product therefrom and simultaneous therewith supplying steam under pressure to said mold.

8. The method of forming a product from a reactive aqueous slurry formulation, which method comprises filling such a slurry into a steam chambered and heated mold, one end of the said mold being open and the surface of the slurry therein exposed, enclosing said open end of said mold to form a chamber over said slurry, admitting a fluid medium under pressure into both said chambers, said media in the mold chamber being at a pressure of approximately 15 p. s. i. gauge, said media in said chamber being at a pressure at least equal to that in said mold chamber, regulating the duration of application of said media to the said chambers in accordance with the thickness of the product and the water to solids ratio of the slurry, discontinuing the said media to said steam chamber and substituting therefor a fluid medium adapted to cool both the free water and the solids of said molded product to a temperature below the boiling point of water at atmospheric pressure, removing the shaped article from the mold and simultaneous therewith readmitting steam to the steam chamber of the mold.

9. The method of forming a reacted integrated product from a reactive slurry formulation which method comprises filling a preheated portion of such a slurry into the mold portion of a steam chambered and heated mold, one end of the said mold being open and the surface of the slurry therein exposed, enclosing said open end to form a space chamber over said slurry, admitting steam under pressure into said steam chamber, said steam being at a pressure of approximately 15 p. s. i. (gauge), admitting fluid under air pressure into said space chamber, said air being under a pressure at least equal to that of said steam, regulating the duration of the application of said steam pressure to the mold in accordance with the thickness of the product and the water to solids ratio of the slurry, discontinuing the steam and substituting therefor a cooling fluid, maintaining the fluid pressure in said space chamber upon said molded product while cooling said product to a temperature below the boiling point of water at atmospheric pressure, reducing said space chamber pressure removing the shaped article from the mold and admitting steam to the steam chamber of the mold.

10. The method of indurating slurry formulations of lime, silica and an excess of water which comprises bringing a measured volume of preheated slurry into filling position with respect to the fill opening of a heated mold, creating a vacuum in said heated mold to cause said slurry to move into and fill said mold, enclosing said fill opening to form a sealed chamber with the slurry exposed therein at said opening, admitting a fluid under pressure into said chamber and into contact with the slurry, regulating the period of said fluid contact in accordance with the wall thickness and the water to solids ratio of the slurry, replacing the heating medium in said mold with a cooling medium and finally discharging the indurated and shaped product.

11. The method of indurating slurry formulations of lime, silica and an excess of water which comprises bringing a measured volume of such slurry into filling position with respect to the fill opening of a heated mold, creating a vacuum in said mold to cause said slurry to move into and fill said mold, enclosing said fill opening to form a sealed chamber with the slurry exposed to the atmosphere of said chamber, admitting fluid under pressure into said chamber and into contact with the slurry, regulating the period of said fluid contact in accordance with the cross-sectional area of said mold and the W./S. ratio of said slurry, replacing the heating media in said mold with a cooling media under pressure and finally discharging the shaped and cooled product.

12. In a device for forming a reacted and integrated product from a molding material the combination of a steam chambered mold having a material molding chamber therein, a cover for said molding chamber forming with said molding chamber a pressure chamber above and cooperating with the molding chamber, means associated with said pressure chamber for admitting fluid under pressure into said pressure chamber to impose fluid pressure on an exposed surface of the molding material in said molding chamber and for relieving said fluid pressure, means to lock said mold and cover in cooperative relationship, means to supply heating and cooling media alternately to said steam chambered mold, and means operable to fill said molding chamber with said material and thereafter eject the formed product therefrom.

13. In a device for forming a reacted calcium silicate product from a molding material the combination of a steam chambered mold having a material molding chamber therein, a cover for said molding chamber forming with said molding chamber a pressure chamber above and in juxtaposed cooperative position therewith, means associated with said pressure chamber for admitting fluid under pressure into said pressure chamber to impose fluid pressure on the molding material in said molding chamber and for relieving said fluid pressure, means operable individually to control the pressure in said molding and pressure chambers, and a single means operable to fill said molding chamber with said material and thereafter eject the formed product therefrom.

14. In a device for forming a reacted calcium silicate product from a molding material the combination of a steam chambered mold having a material molding chamber therein, a cover for said molding chamber forming with said molding chamber a pressure chamber above and in juxtaposed cooperative position therewith, means associated with said pressure chamber for admitting fluid under pressure into said pressure chamber to impose fluid pressure on the molding material in said molding chamber and for relieving said fluid pressure, means for supplying heating and cooling media alternately to the steam chamber of said mold, and means for ejecting the formed product from said molding chamber.

15. In a device for forming a molded calcium silicate product from a molding material the combination of a steam chambered mold having a material molding chamber therein, a removable cover for said molding chamber forming with said molding chamber a pressure chamber above and cooperating with the molding chamber when locked in operative relationship thereto, means associated with said pressure chamber for admitting fluid under pressure into said pressure chamber to impose fluid pressure on the molding material in said molding chamber and for relieving said fluid pressure, means to supply steam under pressure to the mold chamber, means individual to the steam chamber and the pressure chamber and operable independently to reduce the pressure in each of said chambers, and means operable to fill said molding chamber with said material and thereafter eject the formed product therefrom.

16. In an apparatus for indurating a reactive slurry of molding material, the combination of an open ended steam chambered mold member having a material molding chamber therein, a core forming member of hollow form centrally disposed within said molding chamber, a cover for said molding chamber forming with said molding chamber a pressure chamber above and cooperating with the molding chamber, means associated with said pressure chamber for admitting fluid under pressure into said pressure chamber to impose fluid pressure on the molding material in said molding chamber and for relieving said fluid pressure, means for supplying heating and cooling media alternately to said mold and core members, and a member cooperating with said mold and core members operable to fill said molding chamber with said material and to eject the formed product therefrom.

17. In an apparatus for indurating a reactive slurry of molding material, the combination of an open ended steam chambered mold having a material molding chamber therein, a core forming member of hollow form disposed within said molding chamber, a cover for said molding chamber forming with said molding chamber a pressure chamber above and cooperating with the molding chamber, means associated with said pressure chamber for admitting fluid under pressure into said pressure chamber to impose fluid pressure on the material in said molding chamber and for relieving said fluid pressure, means for supplying heating and cooling media alternately to both said mold and core member, and a member cooperating with said mold and core member operable to draw slurry into and fill said molding chamber.

18. In an apparatus for indurating a reactive slurry of molding material, the combination of a steam chambered mold member having a material molding chamber therein, a core forming member of hollow form disposed within said molding chamber, a cover for said molding chamber forming with said molding chamber a pressure chamber above and cooperating with the molding chamber, means associated with said pressure chamber for admitting fluid under pressure into said pressure chamber to impose fluid pressure on the material in said molding chamber and for relieving said fluid pressure, means for supplying heating and cooling media alternately to both said mold and core members, and a member cooperating with said mold and core members operable to fill said molding chamber with said material while moving in one direction and to discharge the formed product while moving in the opposite direction.

19. In the method of making porous integrated hydrous calcium silicate materials, the steps which comprise preparing a mixture containing finely divided reactive silica, finely divided reactive lime and water in a water-to-solids ratio greater than .75 to 1.0 by weight, heating said mixture to a temperature of at least 150° F. and less than 212° F., filling a vertically disposed mold cavity wtih said mixture, providing a layer of water under pressure to the surface of said mixture in said mold cavity, heating said mixture through the mold walls to a temperature above 212° F., while maintaining the water on the surface of the mixture at a pressure greater than the steam pressure corresponding to the temperature to which the mixture is heated, continuing the application of heat through said mold walls until the mixture in said mold cavity has reacted to a degree to form a self-supporting mass, cooling said partially reacted self-supporting mass to a temperature less than 212° F., removing the water under pressure from the surface of the mass in the mold cavity after the mass is cooled, and removing the self-supporting mass from the mold cavity.

20. In the method of making porous integrated hydrous calcium silicate materials, the steps which comprise preparing a mixture containing finely divided reactive silica, finely divided reactive lime, and water in a water-to-solids ratio greater than .75 to 1.0 by weight, heating said mixture to a temperature of at least 150° F. and less than 212° F., filling a vertically disposed mold cavity with said mixture, said mold cavity having a plunger vertically reciprocable therein, said filling being accomplished by having said plunger initially at its uppermost position within said cavity and simultaneously pouring the mixture in said cavity and retracting said plunger downwardly, providing a layer of water under pressure to the surface of said mixture in said mold cavity, heating said mixture through the mold walls to a temperature above 212° F., while maintaining the water on the surface of the mixture at a pressure greater than the steam pressure corresponding to the temperature to which the mixture is heated, continuing the application of heat through said mold walls until the mixture in said mold cavity has reacted to a degree to form a self-supporting mass, cooling said partially reacted self-supporting mass to a temperature less than 212° F., removing the water under pressure from the surface of the mass in the mold cavity after the mass is cooled, and removing the self-supporting mass from the mold cavity by moving the plunger upwardly.

21. In the method of making porous integrated hydrous calcium silicate materials, the steps which comprise preparing a mixture containing finely divided reactive silica, finely divided reactive lime and water in a water-to-solids ratio greater than .75 to 1.0 by weight, heating said mixture to a temperature of at least 150° F. and less than 212° F., filling a vertically disposed mold cavity with said mixture, agitating said mixture in the mold by inserting fingers therein and oscillating said fingers about a vertical axis, providing a layer of water under pressure to the surface of said mixture in said mold cavity, heating said mixture through the mold walls to a temperature above 212° F., while maintaining the water on the surface of the mixture at a pressure greater than the steam pressure corresponding to the temperature to which the mixture is heated, continuing the application of heat through said mold walls until the mixture in said mold cavity has reached to a degree to form a self-supporting mass, cooling said partially reacted self-supporting mass to a temperature less than 212° F., removing the water under pressure from the surface of the mass in the mold cavity after the mass is cooled, and removing the self-supporting mass from the mold cavity.

22. In the method of making porous integrated hydrous calcium silicate materials, the steps which comprise preparing a mixture containing finely divided reactive silica, finely divided reactive lime and water in a water-to-solids ratio greater than .75 to 1.0 by weight, heating said mixture to a temperature of at least 150° F. and less than 212° F., filling a vertically disposed mold cavity with said mixture, said mold cavity having a plunger vertically reciprocable therein, said filling being accomplished by having said plunger initially at its uppermost position within said cavity and simultaneously pouring the mxture in said cavity and retracting said plunger downwardly, agitating said mixture in the mold by inserting fingers therein and oscillating said fingers about a vertical axis, providing a layer of water under pressure to the surface of said mixture in said mold cavity, heating said mixture through the mold walls to a temperature above 212° F., while maintaining the water on the surface of the mixture at a pressure greater than the steam pressure corresponding to the temperature to which the mixture is heated, continuing the application of heat through said mold walls until the mixture in said mold cavity has reacted to a degree to form a self-supporting mass, cooling said partially reacted self-supporting mass to a temperature less than 212° F., removing the water under pressure from the surface of the mass in the mold cavity after the mass is cooled and removing the self-supporting mass from the mold cavity by moving the plunger upwardly.

References Cited in the file of this patent

UNITED STATES PATENTS

| Number | Name | Date |
|---|---|---|
| 476,799 | Johnston | June 14, 1892 |
| 1,409,925 | Calderwood | Mar. 21, 1922 |
| 1,665,308 | Laursen | Apr. 10, 1928 |
| 1,808,191 | Von Wilmowsky | June 2, 1931 |
| 2,085,959 | Donegan | July 6, 1937 |
| 2,432,981 | Abrahams et al. | Dec. 23, 1947 |
| 2,442,519 | Schuetz | June 1, 1948 |
| 2,495,597 | Napier | Jan. 24, 1950 |
| 2,540,354 | Selden | Feb. 6, 1951 |